United States Patent [19]
Hsieh

[11] Patent Number: 6,154,558
[45] Date of Patent: Nov. 28, 2000

[54] INTENTION IDENTIFICATION METHOD

[76] Inventor: Kuan-Hong Hsieh, 5FL., No. 98-3 Kuang Fu S. Rd., Taipei, Taiwan

[21] Appl. No.: 09/064,050

[22] Filed: Apr. 22, 1998

[51] Int. Cl.$^7$ ....................................................... G06K 9/00
[52] U.S. Cl. ........................... 382/103; 382/154; 382/107
[58] Field of Search .................... 382/100, 103, 382/107, 286, 291; 345/358; 348/143, 154, 155, 156

[56] References Cited

U.S. PATENT DOCUMENTS

| 5,454,043 | 9/1995 | Freeman | 382/168 |
| 5,801,704 | 9/1998 | Oohara et al. | 345/358 |
| 5,982,352 | 11/1999 | Pryor | 345/156 |
| 6,002,808 | 12/1999 | Freeman | 382/288 |
| 6,009,210 | 12/1999 | Kang | 382/276 |

*Primary Examiner*—Andrew W. Johns
*Assistant Examiner*—Shervin Nakhjavan
*Attorney, Agent, or Firm*—Bacon & Thomas, PLLC

[57] ABSTRACT

An intention identification method, i.e., a method of tracking movement of an object for the purpose of determining intention in order to operate a computer, includes the steps of processing a pattern of an object captured by a video camera and converting the pattern into a plurality of pixels, analyzing a variation trend of the pixels based on variation of the pixels in any direction relative to a preset geometric center, and comparing a quantity representing the direction and moving amount of the pixels to a characteristic curve, the characteristic curve being formed by a non-activate region set with respect to the center of the pixels, and an activate region also set with respect to the center of the pixels and which is larger than the non-activate region.

8 Claims, 12 Drawing Sheets

INTENTION IDENTIFICATION METHOD

BACKGROUND OF THE INVENTION

1. Field of the Invention

The present invention relates to an intention identification method, i.e., a method of tracking movement of an object for the purpose of determining intention in order to operate a computer, and especially to an intention identification method by which an output Z axis can be generated with respect to an movement of the object image, so that the object may operate a computer system without contacting any other object.

2. Description of the Prior Art

In many public places, such as an exhibition place or information service station, a touch control display is often installed. This device has simplified the conventional clicking operation and also increases interest in the display.

In the touch control display screen, a series of questions and answers are displayed in a frame so that the user may operate a computer by fingers. However, the display screen often mal-functions or gets dirty due to too much touches by user's fingers.

It is also possible to use a video camera to monitor the movement of an object, such as the video camera used in a cable TV security system. This generally used technology, however, can not directly be used to operate the program of a computer, and can not generate a clicking action, such as a mouse, for selectively operating a computer.

SUMMARY OF THE INVENTION

Accordingly, the object of the present invention is to provide an intention identification method, by which a computer may be operated by a small video camera and an identification system.

Another object of the present invention is to provide an intention identification method, in which even a low resolution sensing element can be applied to match the requirement of human behavior.

A further object of the present invention is to provide an intention identification method, which requires only a small portion of memory and calculating ability within the computer to match a single video camera for completing the intention identification.

A further object of the present invention is to provide an intention identification method which may generate a clicking identification function.

A still further object of the present invention is to provide an intention identification method by which a three dimensional intention identification can be achieved.

The other object of the present invention is to provide a special intention identification method, which may applied in all kinds of interactive equipment and systems.

The image of an object is captured by a video camera, and then the pixels with respect to the image signal are approximately analyzed by a trend or centering method for judging the moving intention of the object so to generate different pointing instructions for different directions, such as, stillness, slow movement or fast movement. In the present invention, a single video camera matched with a computer is used to analyze the variation of pixels for determining the moving intention of the object in (X, Y) coordinates, and further determines the intention for the movement in Z axis, and moreover, so that a clicking signal output may be generated.

A video camera matching with a computer generates a clicking output signal through an instruction derived from the movement of an object. The pattern of an object extracted by the video camera is received by a computer, and the pattern is processed and converted into a plurality of pixels. Next, the variation trend of the pixels is analyzed, based on the variation of the pixels in any direction while the initial geometric center of pixels is unchanged. The direction and moving amount are presented by respective characteristic curves so that the intention of the object may be adjusted. The characteristic curve is formed by a non-activate region set with respect to the center point of pixels, and an activate region set with respect to the center point of pixels and which is larger then that of the non-activate region. Thus the computer is operated according to the results of the intention judgment. In the formation of the characteristic curve, a further quick action region is formed with respect to the center point of pixels, which is larger than the activate region.

At least one reference behavior mode is firstly preset, and then the track from the last output signal of the direction and displacement in unit time is compared with the track of the reference behavior mode. If they are similar, then it is determined that the intention of the object is consistent with the mode.

BRIEF DESCRIPTION OF THE DRAWINGS

The present invention will be better understood and its numerous objects and advantages will become apparent to those skilled in the art by referencing to the following drawings in which.

DETAILED DESCRIPTION OF THE PREFERRED EMBODIMENT

The intention identification method of the present invention is shown in FIGS. 1 and FIGS. 19 to 24, wherein the pattern of an object is captured by a video camera (22), the pattern is processed and and then converted into a plurality of pixels, then the variation trend of the pixels is analyzed, based on the variation of the pixels on any direction ($\Delta$PIXELS $\rightarrow \Delta$X, $\Delta$Y, $\Delta$Z), the direction and moving amount being presented by a respective characteristic curve so that the intention of the object may be adjusted and then the computer is operated by the result of the intention.

Figure 1:
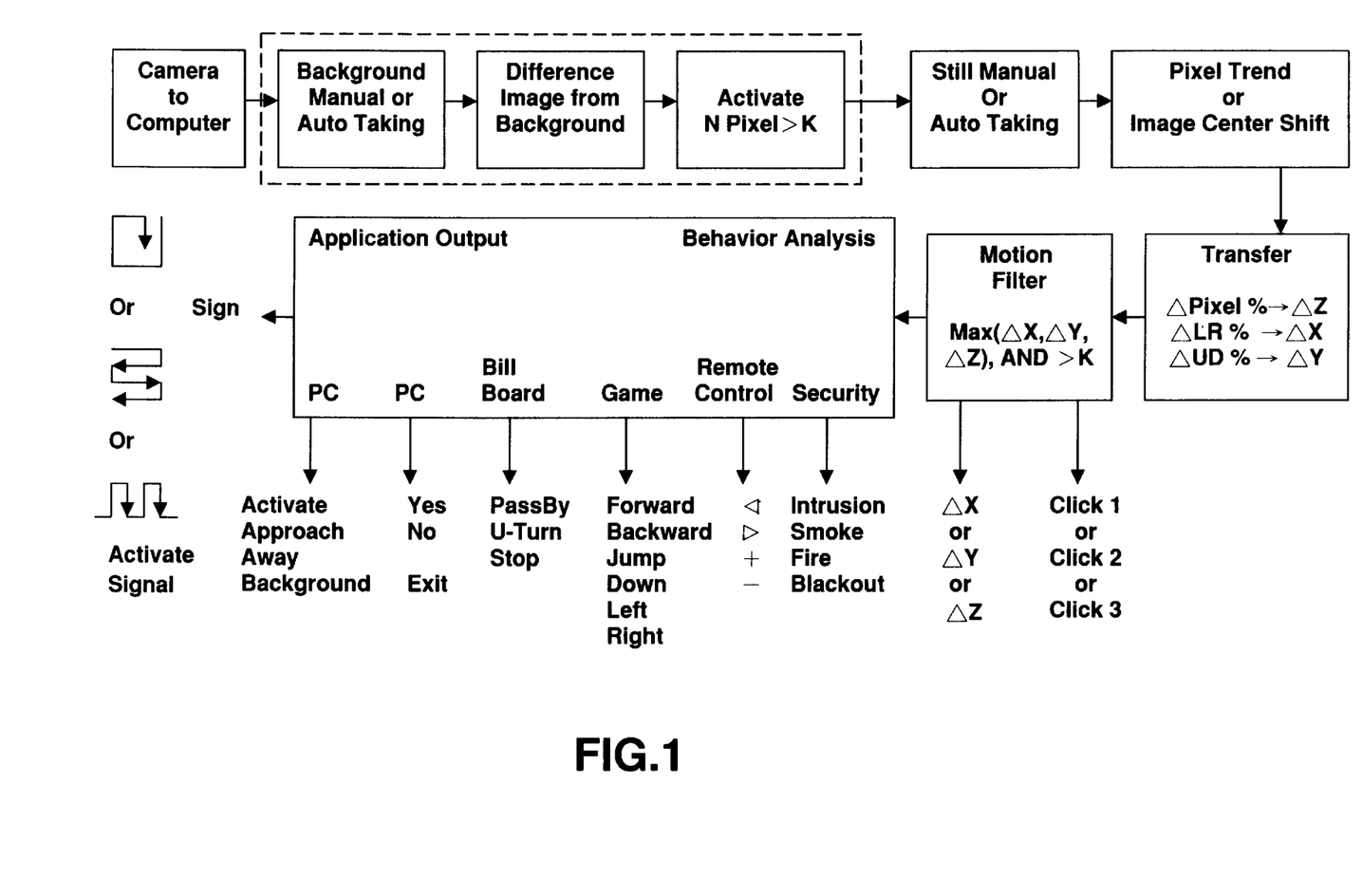
FIG. 1 is the block diagram of the present invention.
Figure 2:
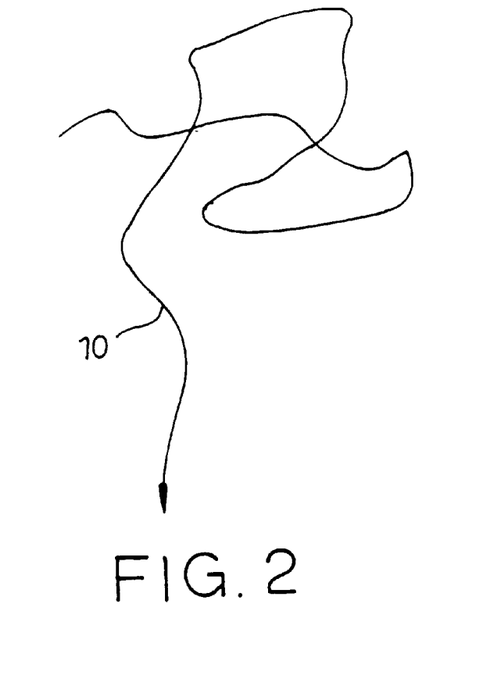
FIG. 2 is a schematic view shown the moving path of an object.
Figure 3:
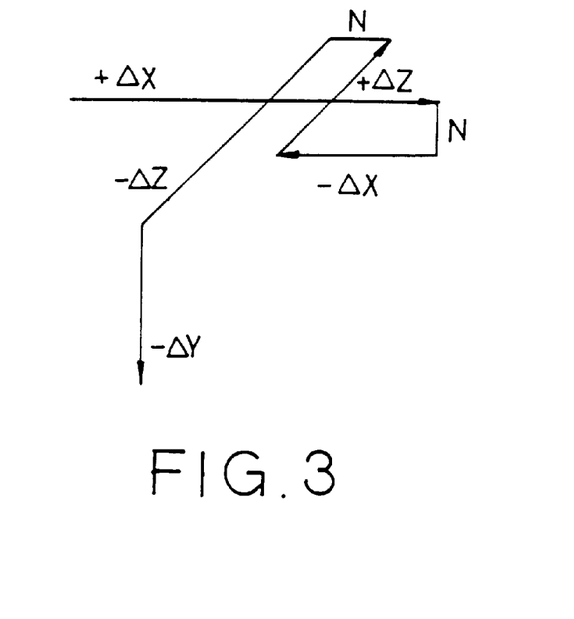
FIG. 3 is a coordinate schematic view, wherein the object image in FIG. 2 has been filtered.

One of the characteristics of the method of the present invention as shown in FIGS. 2 and 3, is that if the moving track (10) of the object as shown in FIG. 2 is a non-regular three dimensional movement, the data about the output direction and the moving amount is firstly filtered by a motion filter, and the maximum vector in any axis in unit time is extracted and taken as a most significant vector, and then the noise is removed so to form an effective tracking curve represented a $\Delta$X and a $\Delta$Y as shown in FIG. 3, and even a $\Delta$Z. Thus, the present invention has the advantages of easily and rapidly calculating the response to the operator action in conformity to the requirements of human nature.

Returning now to FIG. 1 for various applications of the present invention, the track generated from the output direction and moving amount may be used to contrast the predetermined behavior model, i.e. the reference track, and then the behavior model may be identified. For example, if the computer asks the user to answer "yes" or "no" and if the user answers by shaking his or her head, i.e. the respective input is the forward and backward movement in the X axis direction, then it is identified as "no"; similarly, the respective forward and backward movement in the Y axis direction is identified as "yes". Other applications of the reference track may be set to be constructed by learning.

Figure 4:
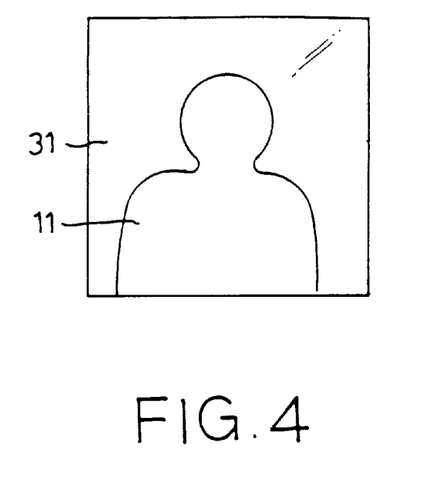
FIGS. 4 and 5 are the embodiments of the object image captured by the video camera of the present invention.
Figure 5:
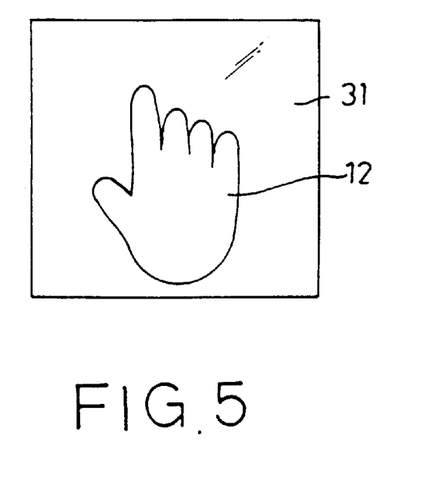
Figure 6:
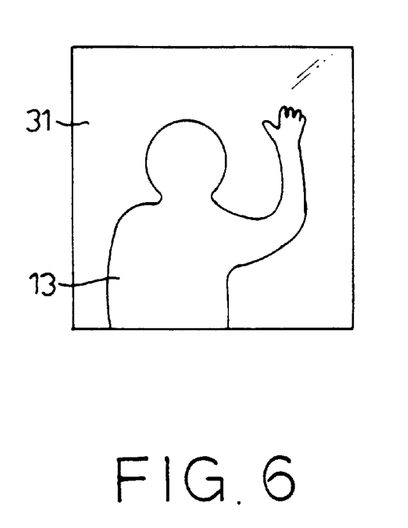
FIG. 6 is similar to FIG. 4, but shows the movement of a hand that has become the main object for intention identification.
Figure 7:
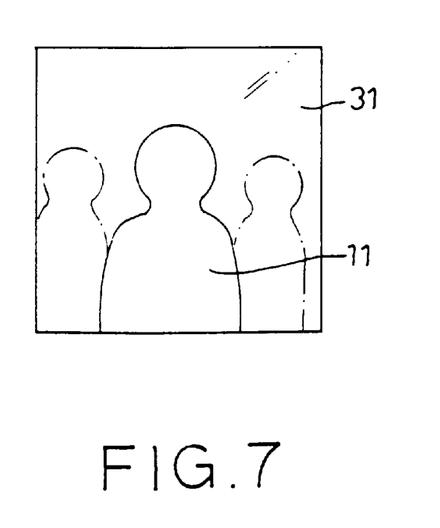
FIG. 7 is similar to FIG. 4, but in which the background of the main object will be filtered.

The object pattern captured by video camera is preferably an active object, for example, some part of a human body as shown in FIG. 4, or the hand as shown in FIG. 5. Of course, it may be a pattern (13) combined with some part of a human body and a hand as shown in FIG. 6, which are determined by the range captured by the video camera and the object presented. FIG. 7 is similar to FIG. 4, but the background displaying the main object (as shown by dashed lines) is cleared.

Figure 8:
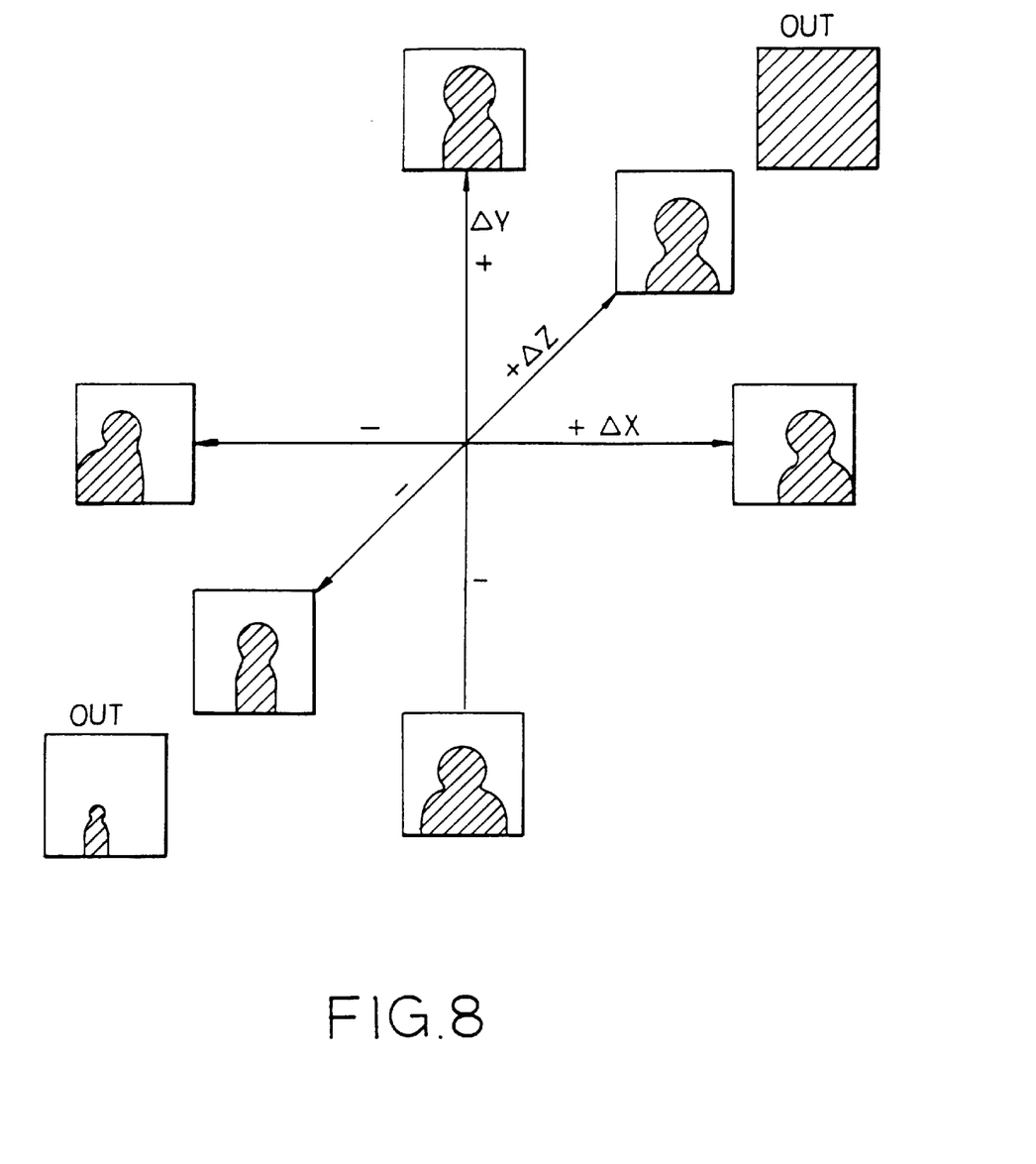
FIG. 8 shows a description figure about movement of the image in the present invention with respect to a three dimensional coordinate.
Figure 11:
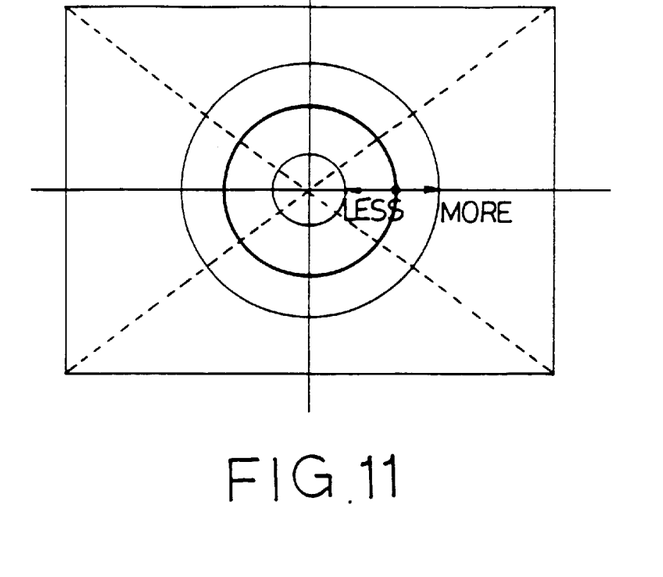
FIG. 11 is a schematic view of the movement of an object in Z axis.
Figure 16:
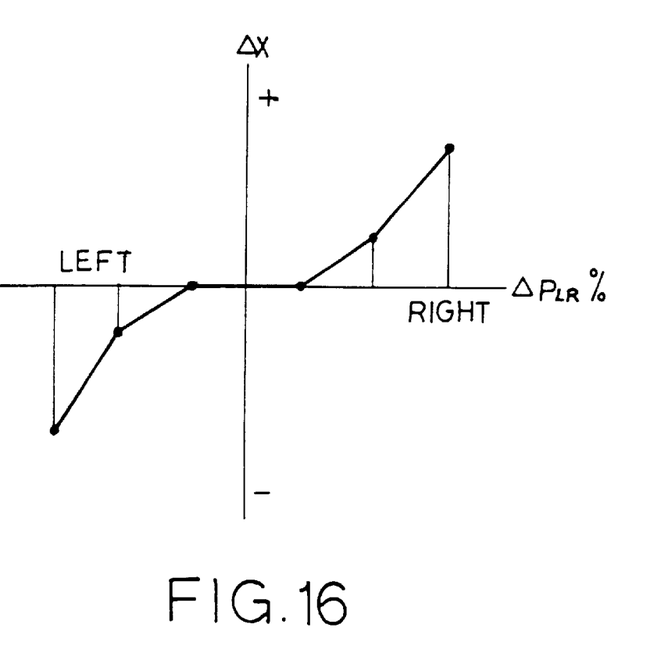
FIG. 16 is a coordinate figure with respect to the nonlinear curve of FIG. 15.

In the present invention, the description about the intention being identified by the pixels of image data is illustrated in FIG. 8 with further reference to FIGS. 11 and 16. The center point (C) of the pixels is derived firstly, then an inclined coordinate retained at 45 degrees with respect to the horizontal or vertical direction is defined by the fixed center point (C), and then four quadrants are formed (DR, DU, DL, and DD).

If the number of the pixels of right quadrant (DR) is increased or that of pixels of the left quadrant (DL) is decreased, and the value of increment or decrement is over a threshold value, then it is identified that the object moves rightwards. The representation (A) is:

$$f\left[\frac{+\Delta P(DR)}{PT}\% + \frac{-\Delta P(DL)}{PT}\%\right] = \Delta X$$

wherein $\Delta$P is the variation of the pixels in quadrant present invention in unit time; while PT is the total amount of the pixels, $\Delta$X represents the action relation with respective to X axis in unit time, and f [ ] represents the characteristic curve.

Figure 9:
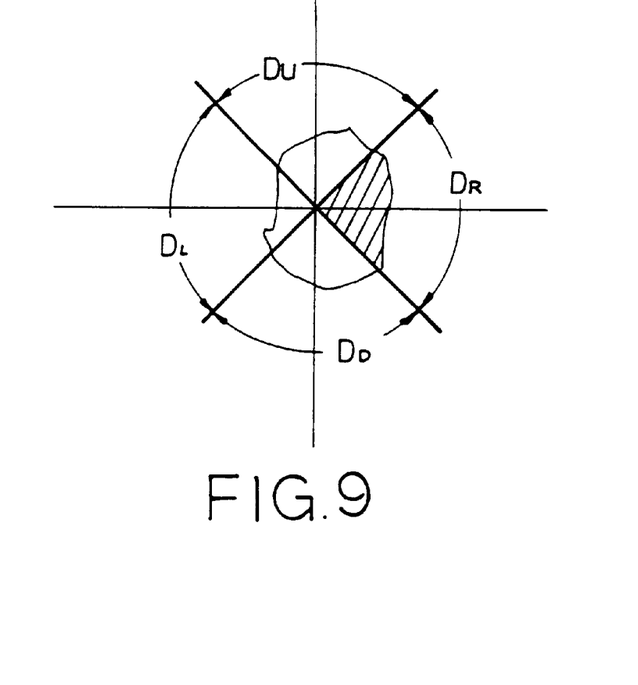
FIG. 9 is a description figure about the set range for judging the intention for the movement of an object.
Figure 9A:
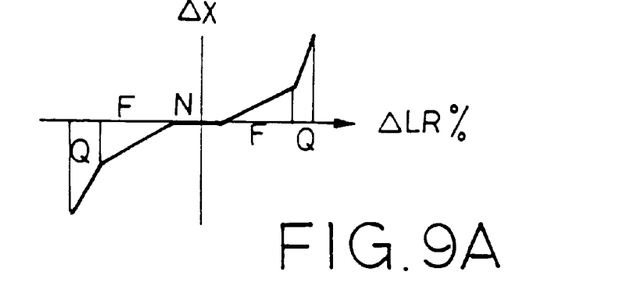
FIG. 9A is a coordinate figure for nonlinear curves with respect to the left and right directions of FIG. 9.

The respective characteristic curve of the equation (A) is shown in FIG. 9A, in which the horizontal line section (N) represents a threshold value below which an adjustment is not made the value is over said threshold, then it is identified that the object has an intention.

Similarly, as the number of pixels of the upper quadrant (DU) or lower quadrant (DL) is varied, the representation (B) is:

$$f\left[\frac{+\Delta P(DU)}{PT}\% + \frac{-\Delta P(DD)}{PT}\%\right] = \Delta Y$$

wherein $\Delta$Y represents action relation of the unit time with the Y axis.

Figure 9B:
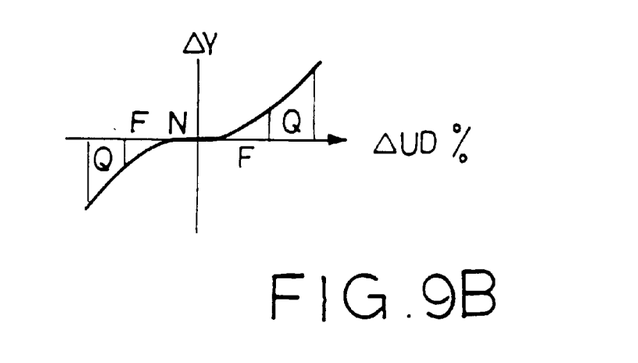
FIG. 9B is a coordinate figure for nonlinear curves with respect to the upper and lower directions of FIG. 9.

The respective characteristic curve of the equation (B) is shown in FIG. 9B, which may be used to judge that the object is intended to move upwards or downwards.

Of course, the movement of an object may be possible in two quadrants simultaneously. For example, the pixels of the right quadrant (DR) and the upper quadrant (DU) maybe changed simultaneously, in which case both the equations (A) and (B) must be used.

Figure 12:
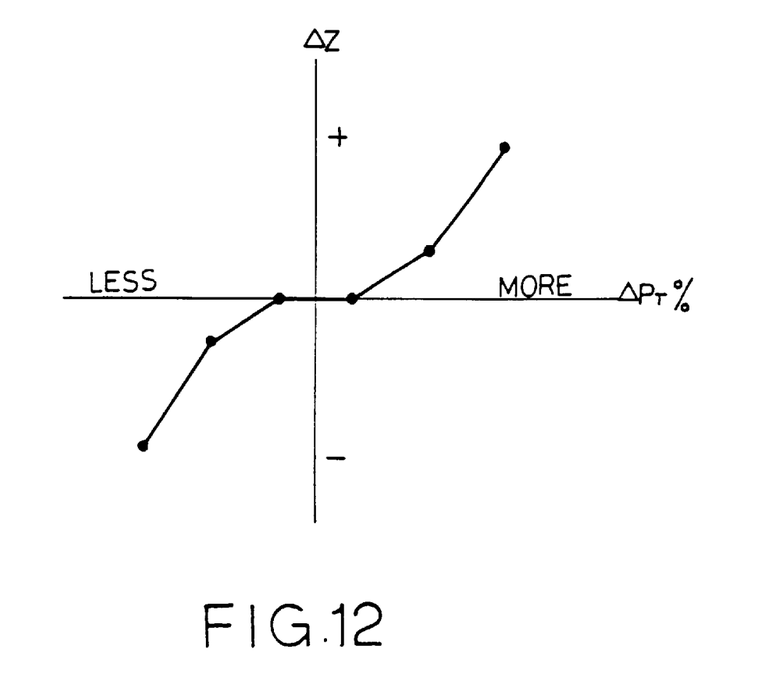
FIG. 12 is a coordinate figure with respect to the nonlinear curve of FIG. 11.
Figure 13:
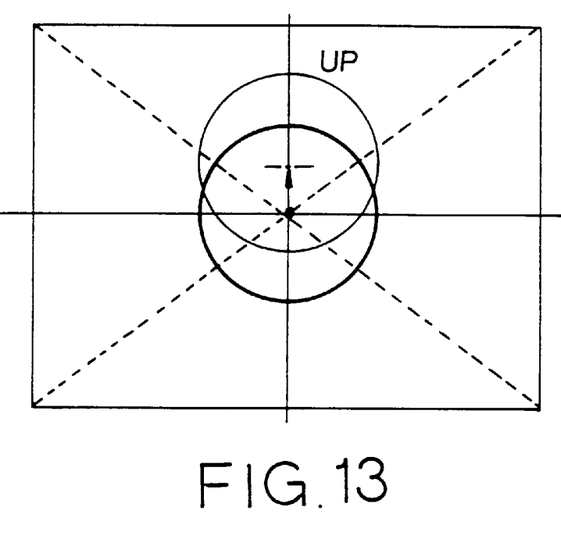
FIG. 13 is a schematic figure showing the upward and downward movement of an object.
Figure 14:
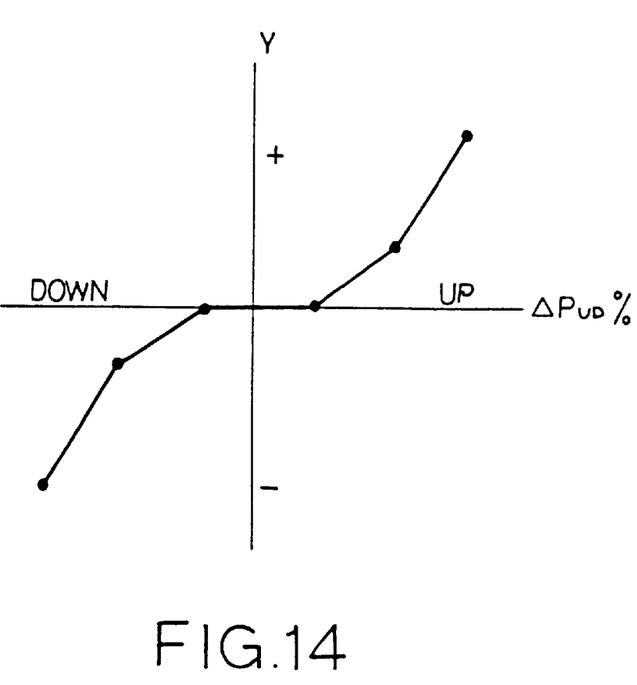
FIG. 14 is a coordinate figure with respect to the nonlinear curve of FIG. 13.
Figure 15:
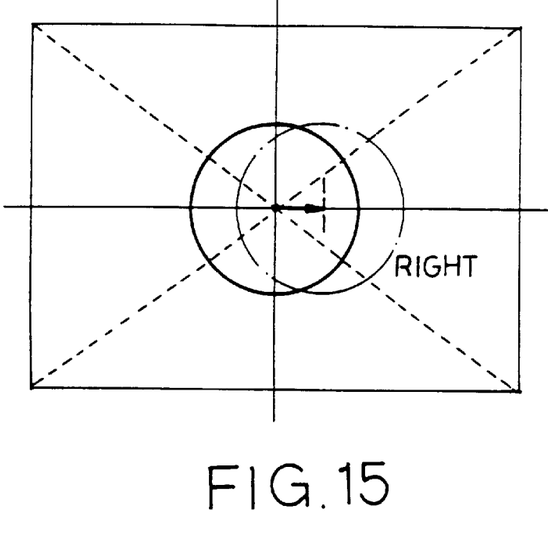
FIG. 15 is a schematic figure showing the leftward and rightward movement of an object.

Moreover, in the present invention, the adjustment of the intention about the forward and backward movements of the object is determined by a function of the variation of the total amount of the pixels, such as equation (C):

$$f\left[\frac{+\Delta P(DT)}{PT}\%\right] = \Delta Z$$

wherein $\Delta$Z purely represents the current relation with respect to the Z axis in unit time, referring to FIGS. 11 and 12. In general, the pixels of at least three quadrants out of the four quadrants are increased or are decreased simultaneously.

In the preferred intention identification method, the following representation may be further used to conforming generate operating functions conforming the requirement of human nature.

Figure 10A:
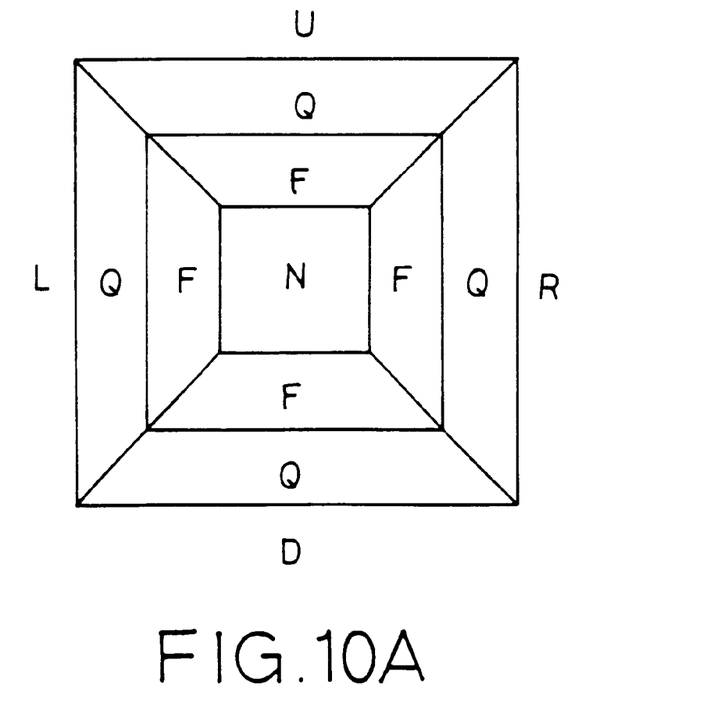
FIG. 10A shows an embodiment, wherein the object image of the present invention captured by a video camera is divided into three control sections according to X axis and Y axis for operating a computer.
Figure 10B:
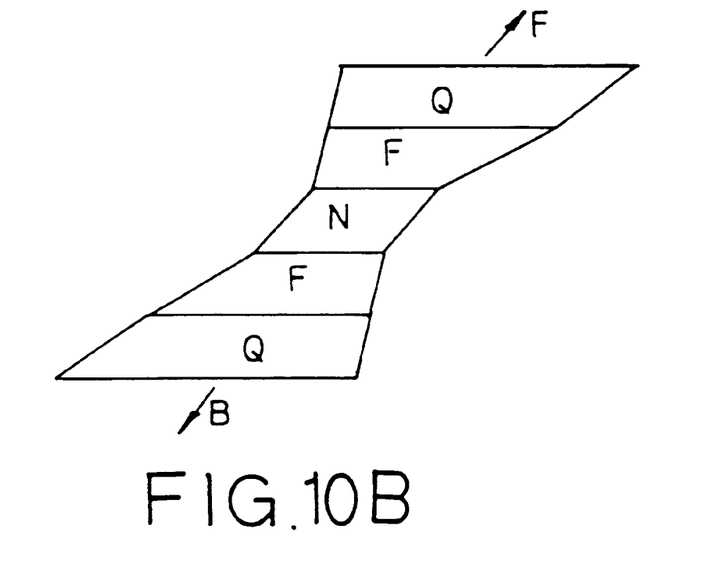
FIG. 10B is similar to FIG. 10A, but the object image of the present invention is divided into three control sections according to a signal for operating a computer.

As shown in FIGS. 10A and 10B, and further referring to FIGS. 11 to 16, at least one non-activate region (N) is set on the-periphery, i.e., right (R), left (L), up (U) and down (D) of the center point of the pixels, and a fine action region (F) is also set and has the same center as the non-activate region. It is preferred that another quick action region (Q) larger then the fine action region is including, and also that the response of the quick action region is according to the operation of speed with equal accelerations or other varied accelerations, so that an error judgment due to a small movement of the object in the non-activate region can be avoided, slow searching or position correction can be performed in the fine action region, or the cursor may be moved rapidly in the quick action region. If the movement of the object is over an effective range, then a non-activate reaction is also generated.

Figure 17:
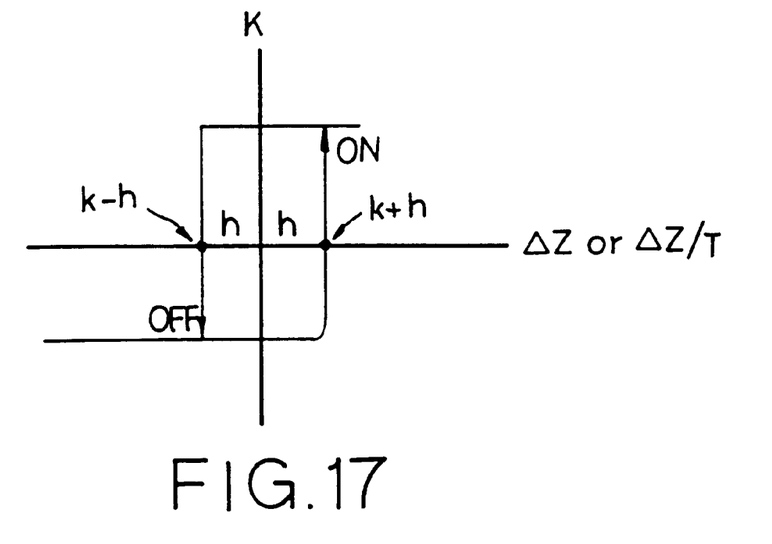
FIG. 17 is a description figure for the buffering action of the clicks in the present invention.

Similarly, in the Z axis direction, three regions (N), (F), and (Q) with forward movement (F) and backward movement (B) are set. The intention for judging the Z axis is preferably used to generate a click action. In the Z axis, in order that the phenomena of vibration and jump are prevented to be generated on the interface of the (N) and (F), or (Q) and (N), or between clicks, it is preferred that as shown in FIG. 17, a buffer region is set. If the clicking action is over the K line, the clicking action is temporarily not activated, unless it has been over the upper threshold (k+h). Similarly, the clicking action has the same action as the object moves downwards, unless it has moved under the lower threshold (k-h).

Figure 18:
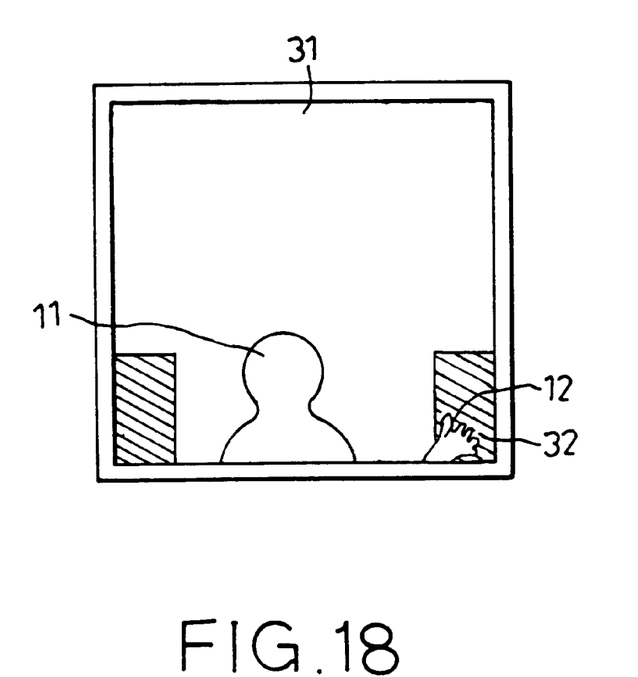
FIGS. 18, 19 and 20 are schematic figures of the embodiment of the menu clicking section in the frame of the present invention.
Figure 19:
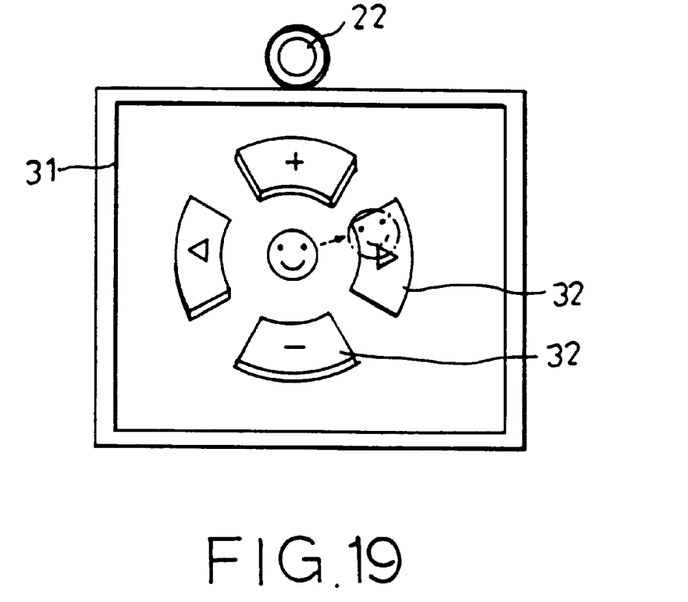
Figure 20:
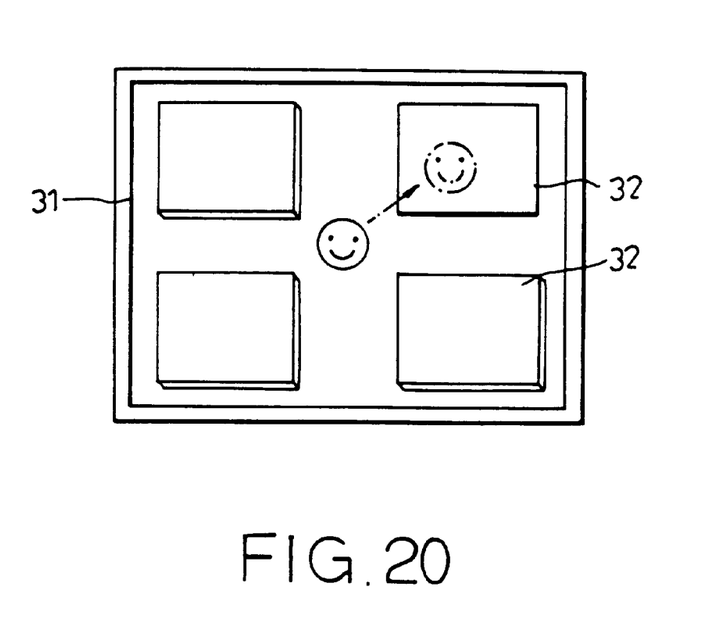
Figure 21:
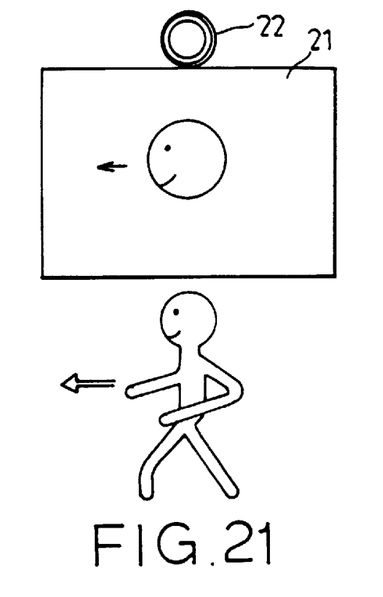
FIGS. 21 and 22 is a description figure showing that the method of the present invention is used in an advertising board.
Figure 22:
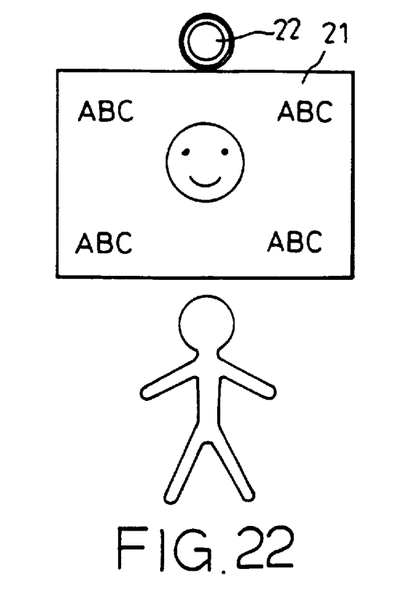
Figure 23:
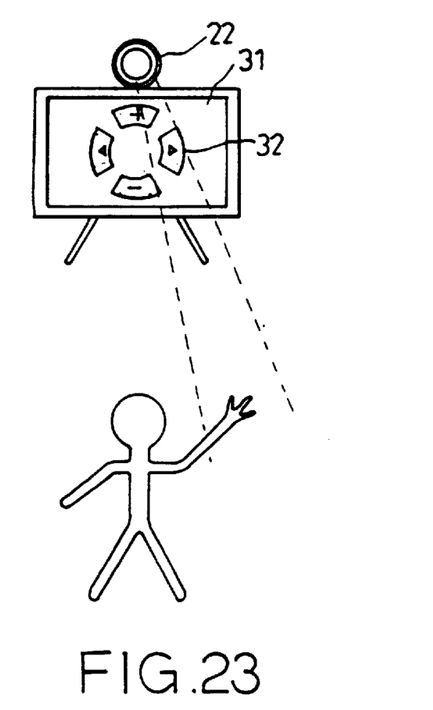
FIG. 23 and 24 is a description figure showing that the method of the present invention is used to remotely control a television.
Figure 24:
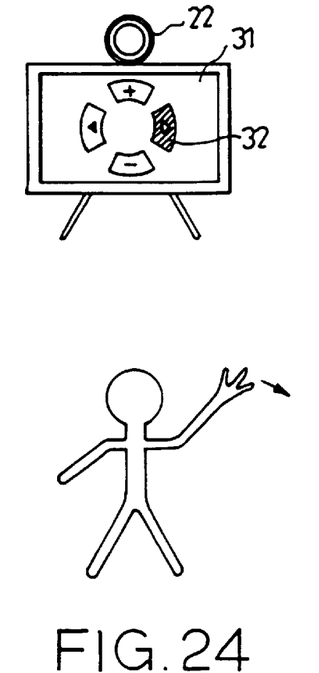

The display screen (31) connected with the computer is shown in FIGS. 18, 19 and 20, wherein the embodiment of the menu clicking region (32) on the frame are schematically shown. The display screen (31) displays an operating pattern menu and cursor icon which is operated by the action of human body, for example, a hand, as a remote control method, such as to remotely control a television as shown in FIGS. 23 and 24, or to link with a pattern on the advertising board.

As shown in FIG. 18, it is preferred that the operating pattern clicking section (32) display on the displayed screen (31) be distributed on the corner section of the screen and operated by human behavior, such as the operation of hand.

The intention identification method of the present invention includes the following steps: (a) the image of an object on the background is firstly captured by a video camera; (b) the pixel data with respect to the object image is set as reference data; a coordinate having X axis, Y axis and Z axis with respect to the center of the pixels of the reference data is built, and then the coordinate value is reset to zero, (c) the coordinate trend in some direction of pixels of the object image is captured at any time; and (d) if the coordinate trend in some direction of pixels of the object image has been over a threshold, then it is determined that the object has moved, and the movement is projected on the X axis and Y axis according to said characteristic curve, after which a signal with respect to the variation of the direction and displacement of pixels is outputted.

One of the characteristics of the present invention is that a signal with respect to the variation of the direction and displacement of pixels is preferred passed through a motion filter for being filtered, the maximum axial vector in unit time is extracted, and noise is removed for preventing an error judgment due to the interference from the environment image and micro-variations from the slight motion of the object.

In step (b), as the object image is continuously static within a period of time, an instruction may be formed as well as by extracting the action of human behavior of interacting to the computer's instruction, and the pixel data with respect to the image is set as a reference data.

In step (d), a pixel center judging method may be used, i.e. the geometric center of pixels of the object image is firstly judged, and according to the variation of the center point, the movement of the object is determined. Alternatively, a method of integral trend judgment of the present invention may also be used, i.e. in any section within X and Y coordinates, the variation of pixels over a predetermined ratio may be used to determine the moving trend of the object.

Although a certain preferred embodiment of the present invention has been shown and described in detail, it should be understood that various changes and modification may be made therein without departing from the scope of the appended claims.

What is claimed is:

1. An intention identification method for tracking and predicting an movement of a pattern of first object captured by a video camera and received by a computer in order to determine an intention of a user and thereby operate the computer, comprising the steps of:

processing the pattern and converting the pattern into a plurality of pixels;

analyzing a variation trend of the pixels, based on variation of the pixels in any direction relative to a preset geometric center of the pixels in order to obtain a quantity representative of a direction and moving amount of the pixels for comparison with a respective characteristic curve so that the intention of the object may be determined; and operating the computer according to results of the intention determination, wherein the characteristic curve is formed by a non-activate region set with respect to center point of the pixels, and an activate region set with respect to the center point of pixels and which is larger than that of the non-activate region, wherein during formation of the characteristic curve, a further quick action region is formed with respect to the center point of the pixels, which is larger than the activate region, and wherein the step of obtaining a quantity representative of a direction and moving amount of the pixels comprises the steps of:

(a) capturing an image of a background object and transferring the captured background object image to the computer;

(b) setting pixel data extracted from the background object image as reference data, constructing a reference coordinate system including X, Y, and Z coordinate axes with respect to said center of the pixels of the reference data, and analyzing said trend of said pixels in said reference coordinate system, said pixel data being selected based on lack of movement of said pixel data within a predetermined time period;

(c) using an integral trend judging method to detect movement of the first object relative to said X and Y coordinate axes, using a variation ratio of movements relative to the respective X and Y coordinate axes to determine a movement trend for the first object; and (d) determining that the object has moved if the movement trend is some direction is over a threshold, and deriving said quantity representative of a direction and moving amount of the pixels.

2. The intention method as recited in claim 1, further comprising the steps of filtering a signal with respect to the variation of the direction and displacement of the pixels through a motion filter, extracting a maximum axial vector for a unit time, and removing noise for preventing an error judgment due to interference from background and micro-variation due to slight motion of the object.

3. The intention method as recited in claim 1, further comprising the step of constructing four quadrants defined by said X coordinate axis and Y coordinate axis, and outputting a Z coordinate signal when numbers of the pixels in at least three of said quadrants have changed in a same way, the variation ratio is a variation ratio based on the total number of pixels that have changed, and the variation ratio is over a threshold.

4. The intention method as recited in claim 1, wherein in step (b), the reference data is set to represent an action of human behavior in interacting to the computer's instruction.

5. The intention method as recited in claim 1, wherein the movement of the first object is detected in step (c) according to an approximate variation of the center point.

6. The intention method as recited in claim 1, wherein said first object is a human body part and said intention is an intention to operate an operating pattern menu and cursor icon displayed on a display screen of the computer, which operated by the action of the human body part.

7. The intention method as recited in claim 6, wherein the operating pattern displayed ion the display screen is distributed on a corner area of the display screen.

8. The intention method as recited in claim 1, further including the step of presetting at least one reference behavior mode, and then comparing a track formed from a last output signal of the direction and displacement quantity in a unit time with a track of the reference behavior mode and, if the direction and displacement quantity track and the reference behavior mode track are similar, interpreting the reference behavior mode as the intention of the object.

* * * * *